United States Patent [19]

Robinson

[11] 4,190,131

[45] Feb. 26, 1980

[54] NOISE ABATEMENT TECHNIQUES AND SYSTEMS

[75] Inventor: William D. Robinson, Ipswich, England

[73] Assignee: Delta Materials Research Limited, Ipswich, England

[21] Appl. No.: 877,729

[22] Filed: Feb. 14, 1978

[30] Foreign Application Priority Data

Feb. 16, 1977 [GB] United Kingdom ................ 6574/77

[51] Int. Cl.[2] ........................ F16L 11/00; B32B 5/14; B32B 7/02; G10K 11/02

[52] U.S. Cl. .................................... 181/296; 138/126; 138/127; 138/137; 138/149; 181/207; 181/288; 181/290; 428/36; 428/159; 428/172; 428/217

[58] Field of Search ................. 428/36, 158, 159, 172, 428/217, 313, 315, 317; 138/114, 147, 148, 149, 177, 126, 127, 137; 181/207, 288, 290, 296

[56] References Cited

U.S. PATENT DOCUMENTS

| | | | |
|---|---|---|---|
| 2,534,811 | 12/1950 | Corlett, Jr. | 138/64 |
| 2,809,145 | 10/1957 | McDermott | 181/207 |
| 3,084,088 | 4/1963 | Hunkeler | 138/148 |
| 3,295,541 | 1/1967 | Ummel | 181/207 |
| 3,562,089 | 2/1971 | Warnaka et al. | 428/417 |
| 3,665,968 | 5/1972 | DePutter | 138/149 |
| 3,814,659 | 6/1974 | Nadeau | 428/317 |
| 3,833,086 | 9/1974 | Giraudeau | 181/207 |
| 3,894,169 | 7/1975 | Miller | 181/207 |
| 3,922,721 | 12/1975 | Gales et al. | 181/207 |

FOREIGN PATENT DOCUMENTS 1331927 9/1973 United Kingdom .

OTHER PUBLICATIONS

IBM Technical Disclosure Bulletin, "Platen for Business Machines", Hymes, vol. 8, #7, Dec. 1965.

*Primary Examiner*—William R. Dixon, Jr.
*Attorney, Agent, or Firm*—Wigman & Cohen

[57] ABSTRACT

The noise emanating from a noise-generating source, such as a machine tool or a stock tube, is reduced by covering the surface from or through which the noise emanates with a cladding comprising a first layer, an intermediate layer, and an outer layer. The first layer, 1 to 5 mm thick, of a resilient vibration-isolating material, being plastic foam, rubber foam, rubber, or fibrous material, has the function of decoupling the intermediate layer from the surface. The intermediate layer, 0.25 to 2.5 mm thick, of lead or metal-loaded plastic material in contact with and supported by the first layer, has the function of a sound-insulating barrier. The outer layer, resistant to impact, wear, and abrasion, has the function of surface protection. The total thickness of the three layers need be no more than 6 mm.

41 Claims, 8 Drawing Figures

NOISE ABATEMENT TECHNIQUES AND SYSTEMS

Figure 1:
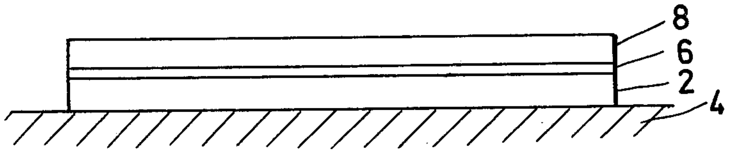

The invention relates to noise abatement techniques and systems and is particularly concerned with methods and apparatus for acoustically cladding machines and other noise-generating sources. The invention also relates to machines and noise generating sources, particularly stock tubes for use with automatic lathes, so cladded.

Noise emanating from or generated by industrial equipment and processes creates many problems including physical effects induced in personnel working in noisy environments leading to such personnel becoming irritated and tense, and consequently, in many cases, accident prone.

Noise is also known to damage hearing and noise abatement is a financial incentive because the potential damages that can be awarded for noise induced hearing loss are considerable. In situations where noise cannot be controlled for some reason, it is necessary to at least ensure that the noise in the working environment is kept within the overall level prescribed by law, the provision of personal hearing protection often being permissible only as a temporary measure until a more permanent solution is found.

Certain kinds of noise are identifiably and definitely injurious and some action must be taken to control same. The ideal solution would of course be to remove or reduce the noise at the source, but this is not always feasible or easy. Some types of noise, possibly a majority of them, are due to the design and perhaps assembly of the equipment, while others are produced by the method of operation, such as is the case with automatic lathes, plastic granulating machines, transformers, motors and pumps, air or gas intakes and discharges, pile-driving hammers, etc.

A variety of noise control equipment is available. Thus there are damping materials for control of plant noise, the principal areas of application thereof being in the control of impact-generated noise; enclosures with walls and covers made of or lined with noise absorbing insulation materials; and there are also available noise reducing doors, panels, and silencers for engines, compressors, and the like.

As noted, in most noise control situations the object of the exercise is to prevent the noise being generated in the first instance but, also as noted, this is not possible in many applications or, where possible, the noise reduction achieved is not sufficient to reduce the noise emanating from the machines or the like to an acceptable level. When noise has been generated the problem then becomes that of containing the noise, reducing its ability to spread and affect personnel or quiet areas in a factory, plant or the like. The majority of the techniques presently available for preventing the spread of noise depend upon the use of enclosures which, while more or less effective in containing the noise, present many problems including those of floor space requirements, access to the machine for operating and servicing same and in most cases such enclosures present difficult ventilation problems.

It is an object of the present invention to overcome or minimize the aforenoted problems by providing a method of reducing the noise emanating from or generated by industrial equipment and processes and other noise sources and by providing an acoustic cladding for use therein which offers a high degree of noise insulation and which hence has an excellent ability to contain noise.

Another object of the invention is to provide an effective noise reducing cladding that can be applied to vibrating surfaces to reduce the noise emanating from such surfaces by providing a noise insulating barrier thereat.

A further object of the invention is to provide a stock tube having an acoustic cladding effective to improve the noise characteristics of the stock tube enabling the noise emission from the stock tube to be controlled within acceptable limits irrespective of the machine density.

The cladding according to the invention is so designed that it avoids or mitigates the various disadvantages which are referred to in the foregoing and which are commonly associated with the use of acoustic enclosures. Furthermore it is envisaged that the cladding according to the invention may be applied to a diverse range of machines and processes, amongst which may be noted by way of example, the stock tubes of automatic lathes, the machine surfaces of plastic granulators, the body panels of processors, and machines where there is a need for part enclosure effects, such as with presses and lathes and many similar machines.

In accordance with the invention, a composite material for acoustically cladding a noise source comprises a layered or laminated structure adapted to be disposed about the noise source, said structure comprising a first or inner layer or laminate which is designed to be positioned in contact with the surface from or via which the noise emanates and which comprises a layer of resilient material, an intermediate layer or laminate comprising a limp, sound insulating material and a third or outer layer or laminate which comprises an outer protective cover.

Preferably the first or inner layer, which serves as a vibration-isolating layer, positioned in immediate contact with the surface from or via which the noise emanates, consists of a non-rigid plastic or rubber foam or fibrous material having a hardness in the range of 0 to 100 degress on the Shore 00 scale. More particularly it is preferred that the material have a hardness in the range 5 to 95 degrees and still more preferably in the range 25 to 70 degrees on the Shore 00 scale. It is also preferable that this inner laminate should be self adhesive.

Alternatively the first or inner layer may consist of soft rubber one surface of which is castellated or formed with a series of projections adapted to engage the surface from or via which the noise is transmitted and which construction ensures that the area in contact with said surface is the minimum necessary to support the cladding. The inner layer may suitably be fabricated of soft rubber in the hardness range of 1 to 50 degrees, preferably 10 to 30 degrees, on the Shore A scale. The inner layer may also be fabricated of foam or of fibrous material.

The intermediate laminate or layer is designed as a heavy, limp, sound insulating barrier and may suitably be fabricated of lead sheet or may be in the form of a metal-loaded plastic barrier sheet.

The third or outer laminate or layer which is designed to provide impact-, wear- and abrasion-resistance as well as physical support is suitably made of a hard rubber, plastic or bitumastic material having a hardness in the range 50 to 100 degrees on the Shore A scale and preferably in the range 90 to 100 degrees on the Shore A scale.

In accordance with another aspect of the invention, a method of reducing the noise emanating from noise-generating sources such as machine tools and the like comprises the steps of disposing a first layer of a resilient, vibration-isolating material around and in contact with a surface from or via which the noise emanates, disposing about said first layer an intermediate layer of a limp, sound insulating material and enclosing said first and intermediate layers in an outer, surface-protective layer.

The aforementioned techniques and claddings have proved effective to reduce noise by about 22 dB(A) and can be classed as single stage noise reduction treatments. Other single stage treatments would, for example in the case of stock tubes, consist in the introduction of a non-metal liner into the stock tube to reduce the impact noise of the stock and tube; a variation of this would be the use of a stock carriage spring in lieu of a liner; and another approach to the noise reduction problem would be the use of a steel outer tube separated from the stock tube by an isolating media pad.

In accordance with another aspect of the present invention, for use in applications where single stage noise treatments do not provide a sufficient degree of noise attenuation, it is contemplated that a two-stage noise reducing treatment will be employed, in which case the cladding would be as described hereinbefore, but omitting the outer surface-protecting layer, and replacing same by another vibration-isolating layer of, for example, foam plastic or rubber, and inserting the whole assembly inside a noise insulating outer tube.

In a typical application, a stock tube according to the invention and employing a two-stage noise reducing treatment as contemplated in the preceding paragraph would thus be provided with cladding comprising an inner layer disposed in contact with the outer surface of the stock tube and consisting of a first vibration-isolating layer, preferably of a closed cell foam material, a sound-insulating or barrier layer and a second vibration isolating layer similar to said first layer, all inserted into a rigid outer casing, such as a steel tube.

Figure 3:
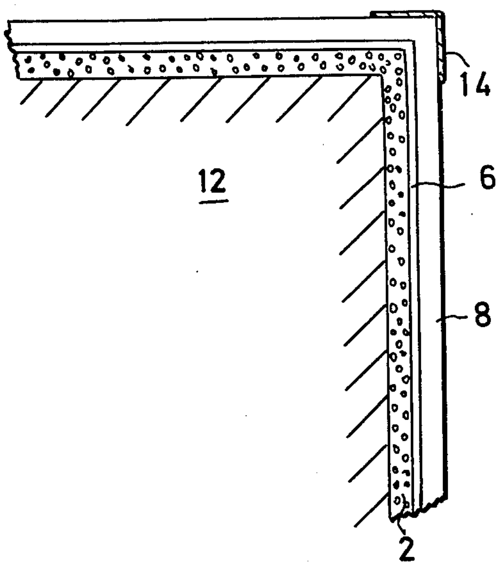
Figure 5:
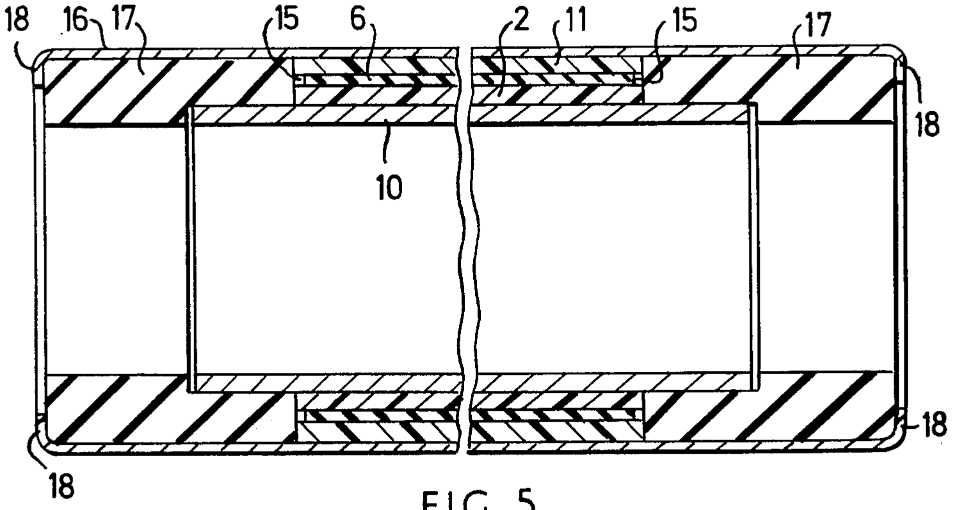
Figure 6:
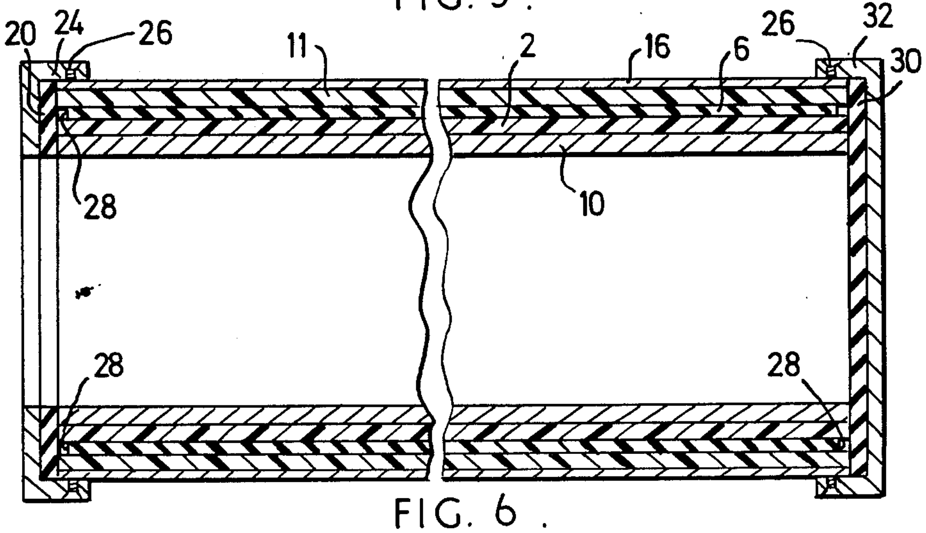

Other objects of and features which may be included in accordance with the invention will be described hereinafter with reference to FIGS. 1 to 6 of the accompanying drawings which show, by way of example, exemplary embodiments of the invention and in which:

FIG. 1 shows, diagrammatically, a section of cladding material according to the invention as applied to a machine surface;

FIGS. *2a* and *2b* are cross-sectional views showing different embodiments of cladding material according to the invention as applied to a stock tube for an automatic lathe;

FIG. 3 is a fragmentary view in section showing cladding material according to the invention as applied to a plastic granulator;

FIGS. *4a* and *4b* are cross-sectional views showing embodiments of a two-stage noise-reducing treatment cladding as applied to a stock tube; and FIGS. 5 and 6 are longitudinal section views of stock tubes as shown in FIGS. *4a* and *4b* showing different embodiments of end cap arrangements which may be employed.

Referring to FIG. 1 which shows the basic construction of the cladding material according to the invention, it will be seen that it comprises three laminates or layers.

The first or inner layer 2 is designed to abut against the surface from or via which noise is generated or transmitted, such as the vibrating surface 4 of a machine. This inner layer 2 may or may not be castellated or otherwise formed in one surface with a pattern of projections adapted to engage the surface 4.

The second or intermediate layer 6 comprises a limp, sound insulating material.

The third or outer layer 8 constitutes the outer protective cover of the cladding designed to provide impact-, wear- and abrasion-resistance and physical support.

Figure 2A:
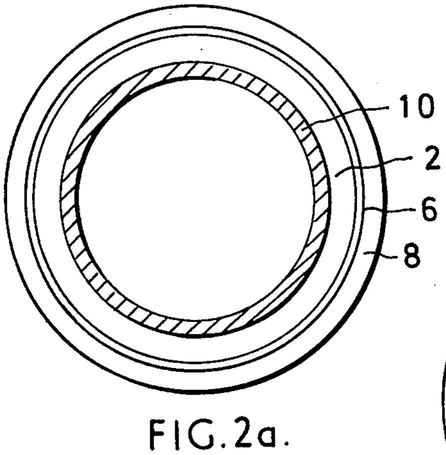
Figure 2B:
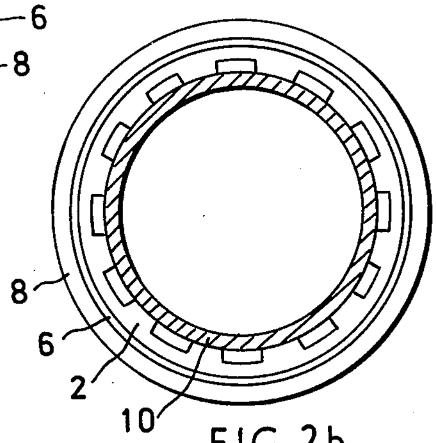

The constitution of the basic cladding as shown in FIG. 1 and in specific applications in each of FIGS. 2 and 3 may take numerous forms and various examples of cladding involving laminations or layers of different combinations of materials are set forth in Table 1 hereafter.

Preferably, the overall thickness of the cladding, which would include all three laminations, is in a range up to about 6 mm.

TABLE I

| | FIRST OR INNER LAYER 2 | | | SECOND OR INTERMEDIATE LAYER 6 | | THIRD OR OUTER LAYER 8 | | |
|---|---|---|---|---|---|---|---|---|
| EXAMPLE | Material | Hardness on Shore Scale (degrees) | Thickness (millimeters) | Material | Thickness (millimeters) | Material | Hardness on Shore Scale (degrees) | Thickness (millimeters) |
| 1 | Profiled or castellated soft rubber | A - Scale 0 to 50 | 1.0 to 5.0 | heavy, limp sound insulating barrier | 0.25 to 2.5 | rubber or plastic or bitumastic | A - Scale 0 to 100 | 0.1 to 3.0 |
| 2 | non rigid foam or fibrous material | 00 - Scale 0 to 100 | 1.0 to 5.0 | heavy, limp sound insulating barrier | 0.25 to 2.5 | rubber or plastic or bitumastic | A - Scale 0 to 100 | 0.1 to 3.0 |
| 3 | Profiled or castellated soft rubber | A - Scale 10 to 30 | 1.0 to 5.0 | thin lead sheet | 0.25 to 2.5 | rubber or plastic | A - Scale 50 to 100 | 0.1 to 2.0 |
| 4 | plastic or rubber foam | 00 - Scale 5 to 95 | 1.0 to 5.0 | thin lead sheet | 0.25 to 2.5 | rubber or plastic | A - Scale 50 to 100 | 0.1 to 2.0 |
| 5 | Profiled or castellated soft rubber | A - Scale 10 to 20 | 1.0 to 5.0 | thin lead sheet | 0.4 to 1.2 | rubber or plastic | A - Scale 50 to 100 | 0.1 to 2.0 |
| 6 | plastic or rubber foam | 00 - Scale 10 to 90 | 1.0 to 5.0 | thin lead sheet | 0.4 to 1.2 | rubber or plastic | A - Scale 50 to 100 | 0.1 to 2.0 |
| 7 | plastic or rubber foam | 00 - Scale 15 to 80 | 1.0 to 5.0 | thin lead sheet | 0.4 to 1.2 | plastic or rubber or bitumastic | A - Scale 50 to 100 | 0.1 to 2.0 |
| 8 | plastic or rubber foam | 00 - Scale 25 to 70 | 1.0 to 3.0 | thin lead sheet | 0.8 to 1.2 | thin coating of plastic rubber or bitumastic | A - Scale 50 to 100 | 0.1 to 2.0 |
| 9 | PVC or polyethylene foam | 00 - Scale 25 to 70 | 1.0 to 3.0 | lead sheet | 0.8 | PVC or polyurethane or polyethylene | A - Scale 90 to 100 | 0.1 to 1.5 |

Practical applications of the above described cladding material are shown in FIGS. 2 and 3.

Thus FIG. 2 shows two variations of the cladding material applied in the form of a sheath to a tube 10 such, for example, as the stock tube of an automatic lathe or the stock tube of a reeler straightening machine.

In FIG. 2(*a*) the inner laminate 2 has a non-castellated inner surface whilst in FIG. 2(*b*) the inner laminate 2 is of castellated configuration. In the applications shown in FIGS. 2(*a*) and 2(*b*) the cladding is effective to reduce the noise emanating from tube 10 as the bar stock strikes the walls of the tube.

In experiments made, by way of example, with a bar stock tube for an automatic lathe with 99.5 percent of the surface being covered with a cladding constituted as in Example 9 (Table 1) it was found that a reduction of some 23 dB(A) was achieved when compared to a similar stock tube devoid of such cladding.

FIG. 3 shows the application of the cladding material to a plastic granulating machine, generally designated 12, for which it provides an insulating barrier which constitutes an effective noise reducing cladding that can be applied to reduce the noise emanating from the surfaces of the granulator. In this embodiment the corners of the cladding are sealed as, for example, by polyvinylchloride tape 14.

In experiments made with a plastic granulating machine provided with cladding constituted as in Example 9, applied to 95 percent of the machine surface, it was found that a reduction of some 14 dB(A) was achieved as compared to the same machine not so cladded.

Figure 4A:
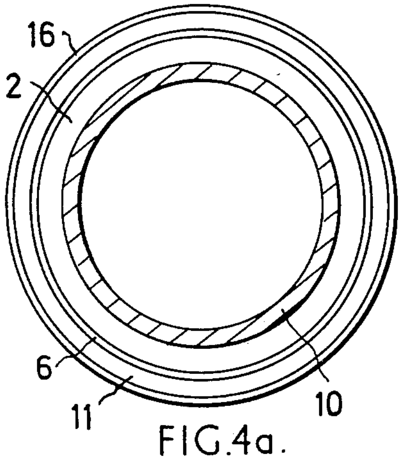
Figure 4B:
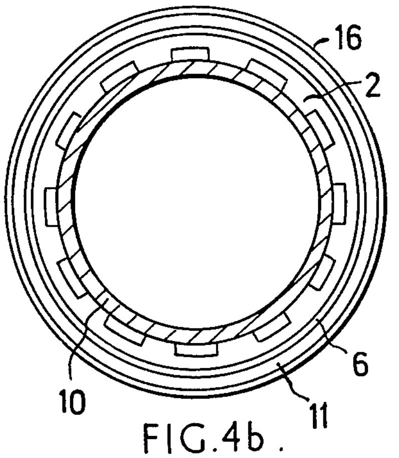

In some applications, single-stage noise reducing treatments as described in the foregoing may not provide the desired degree of noise attenuation, as, for example, where the requirement is to reduce the noise from a stock tube of an automatic lathe to at least 6 dB(A) below the noise produced by the lathe to which the stock tube is attached. In a typical situation of this kind under semi-anechoic conditions, measuring the noise 1 meter from the machine surface and 1.5 meters above floor level, it has been found that a typical automatic lathe produces a noise level of about 84 dB(A). If the lathe stock tube and the lathe are considered as separate noise sources, a stock tube which reduced noise to 84 dB(A) when added to the machine noise would increase the combined noise level to 87 dB(A). To provide maximum effectiveness in noise reduction a stock tube noise level 10 dB(A) below machine noise level is necessary, i.e. 74 dB(A). To achieve this it has been found necessary to employ a two-stage noise reducing treatment. As shown in FIG. 4, this may be effected, in the case of a stock tube, for example, by cladding the tube 10 in the manner described with reference to FIGS. 2*a* (as shown in FIG. 4*a* ) and 2*b* (as shown in FIG. 4*b*), but changing the third or outer surface-protecting layer 8 and replacing it by another vibration-isolating layer 11 of a resilient material such as foam plastic or rubber, and inserting the whole assembly inside a noise insulating outer steel tube 16. With this arrangement, special care must be taken to prevent bridging of the vibration-isolating layers 2 and 11, which would permit vibration flanking paths to be set up. Such paths would counteract the effect of the treatment. For this reason, the ends of the tube are provided with seals made of a suitable material such, for example, as a soft silicone or polyurethane rubber.

Table II shows the comparative results for a number of different type stock tubes and the noise produced by such tubes when driven by ½-inch A.F hexagonal steel stock rotating at 8,000 rpm. From Table II it will be appreciated that a two-stage noise reduction system is necessary if the stock tube noise is to be reduced 10 dB(A) below the lathe noise level, i.e. 74 dB(A). A lathe noise level on the order of 84 dB(A) is about the maximum that can be tolerated if the recommended noise level of 90 dB(A) is to be achieved in an automatic lathe shop. This is due to the high machine density and hence the additive noise effects that are prevalent in such automatic lathe shops.

TABLE II

| Item | Stocktube Type<br>Tubes 2-6 one-stage noise reduction<br>Tubes 7-10 two-stage noise reduction | Maximum stock size for tube (inches) | Outer diameter of stock tube (inches) | Surface in contact with stock | Noise level on test rig dB(A) | Noise reduction compared with Plain steel tube Item 1 dB(A) |
|---|---|---|---|---|---|---|
| 1 | Plain steel tube. | 0.63 | 0.79 | steel | 103.0 | 0 |
| 2 | Plain steel tube fitted with a spring. | 0.58 | 1.00 | steel spring | 76.0 | 27.0 |
| 3 | Plain steel tube fitted with a nylon liner. | 0.44 | 1.00 | Nylon | 90.0 | 13.0 |
| 4 | Two concentric steel tubes with the space therebetween filled with expanded soft polyurethane foam. | 0.58 | 1.625 | steel | 77.0 | 26.0 |
| 5 | Moulded plastic inserts inside a steel tube to concentric plastic inner and steel outer with the space between not filled. | 0.53 | 1.13 | Nylon | 78.0 | 25.0 |
| 6 | Steel tube wrapped with isolating material supporting a wrapping of insulating material and surface protecting layer. | 0.63 | 1.25 | steel | 82.0 | 21.0 |
| 7 | As tube 6 but with convolute spring inserted into the inner tube. | 0.58 | 1.25 | steel spring | 66.0 | 37.0 |
| 8 | High molecular weight polyolefin tube (such as polyethylene or polypropylene) spirally wrapped with polyurethane foam in an outer steel sheath. | 0.56 | 1.25 | Nylon | 77.0 | 26.0 |
| 9 | As tube 6 but with a nylon tube inserted into the inner steel tube. | 0.63 | 1.25 | Nylon | 77.0 | 26.0 |
| 10 | A two-stage noise reduction tube according to the present invention as shown in FIGS. 4 to 6 and consisting of a steel inner tube supporting a layer of closed cell isolating foam, a noise insulating or barrier layer and a further layer of closed cell isolating foam, all inserted onto an outer steel tube. | 0.53 | 1.00 | steel | 70.0 | 33.0 |

To avoid bridging of the vibration isolating layers 2 and 11 and thereby to avoid the establishment of sound transmission paths between the inner tube 10, the intermediate sound insulating layer 6 and the outer tube 16 of the composite stock tubes, according to the present invention, are terminated in a suitable manner such as shown in FIGS. 5 and 6.

In the arrangement shown in FIG. 5 a bush or spacer 17, preferably of rubber suitably having a hardness in the range of 10° to 70° on the Shore A scale, is fitted over and protrudes beyond each end of the inner tube 10 into abutting relationship with the vibration isolating layers 2 and 11 and the sound insulating layer 6. The end portions 18 of outer tube 16 extend beyond the bushes or spacers 17 and are turned inwardly into engagement with the outer end of each of the bushes or spacers 17 to retain same in position. The outer end portions of the sound insulating layer 6 are preferably, although not necessarily, undercut in the manner shown at 15 in FIG. 5 so that they terminate inwardly of the ends of the vibration isolating layers 2 and 22 which latter are themselves terminated inwardly of the ends of tube 10. This arrangement avoids any possibility of setting up sound transmission paths between the outer tube 16, the inner tube 10 and the intermediate sound insulating layer 6.

In the arrangement shown in FIG. 6 the end portions of the sound insulating layer 6 are preferably slightly undercut with respect to layers 2 and 11. At the left hand end of the stock tube as viewed in FIG. 6 there is provided an annular bush or spacer 20 preferably of rubber suitably having a hardness in the range of 0 to 70 degrees on the Shore A scale and having an outside diameter corresponding to that of the outer tube 16. The bush 20 is secured in abutting relationship with the end of the composite tube by means of an end cap 24 suitably of steel and adapted to be removably fitted over the end of the composite tube and secured thereon by means of screws or pins 26. At its other end the composite tube shown in FIG. 6 is provided with a similar though non-apertured end cap 32 with a solid bush 30 therein.

In all cases it will be appreciated that one end cap must be annular to permit insertion of a workpiece within the stock tube and hence each composite tube may, for example, be provided with one end cap 24 and one end cap 32 (i.e. the arrangement shown in FIG. 6) or, alternatively, with two of the end caps 24, or each end may be terminated in the manner shown in FIG. 5.

I claim:

1. A method of reducing the noise emanating from a noise generating source, such as a machine tool, comprising the steps of:

(a) covering a surface from or through which the noise emanates with a first flexible layer of a resilient vibration-isolating material selected from a group consisting of plastic foam, rubber foam, rubber, and fibrous material, said first layer being in contact with and supported by said surface from or through which the noise emanates;

(b) covering the first layer with an intermediate flexible layer of a heavy, limp, sound-insulating barrier material, said first layer being in contact with and supporting the intermediate layer and decoupling the intermediate layer from said surface from or through which the noise emanates; and (c) covering the intermediate layer with an outer flexible surface-protective layer resistant to impact, wear, and abrasion;

whereby a cladding, consisting of a flexible layered structure, is formed for reducing the noise emanating from the noise generating source.

2. A method as claimed in claim 1, including the further step of:

interposing between and in contact with the intermediate and outer layers an additional layer of a resilient vibration-isolating material selected from a group consisting of plastic foam, rubber foam, rubber, and fibrous material, said additional layer decoupling the outer layer from the intermediate layer.

3. A method as claimed in claim 2, wherein the additional layer is about 1 to 5 mm thick.

4. A method as claimed in claim 1, in which the resilient vibration-isolating material has a hardness in one of the ranges of 0 to 100 degrees on the Shore 00 scale and 0 to 50 degrees on the Shore A scale.

5. A method as claimed in claim 4, in which the hardness is in one of the ranges of 5 to 95 degrees on the Shore 00 scale and 10 to 30 degrees on the Shore A scale.

6. A method as claimed in claim 5, in which the hardness is in the range of 25 to 70 degrees on the Shore 00 scale.

7. A method as claimed in claim 1, in which the face of the first layer adjacent to the surface has a series of castellations or projections in contact with said surface.

8. A method as claimed in claim 1, in which the sound-insulating barrier material is selected from a group consisting of lead and metal-loaded plastic material.

9. A method as claimed in claim 1, in which the outer surface protective layer is about 0.1 to 3 mm thick and is made of a material selected from a group consisting of hard rubber, plastic, and bitumastic material.

10. A method as claimed in claim 9, in which said material of the outer surface-protective layer has a hardness in the range of 50 to 100 degrees on the Shore A scale.

11. A method as claimed in claim 10, in which the hardness is in the range of 90 to 100 degrees on the Shore A scale.

12. A method as claimed in claim 1, in which the total thickness of the three layers is at most 6 mm.

13. A method as claimed in claim 1, wherein the first layer is about 1 to 5 mm thick and the intermediate layer is about 0.25 to 2.5 mm thick.

14. A cladding for reducing the noise emanating from a noise-generating source having a surface from or through which the noise emanates, said cladding consisting of a flexible layered structure adapted to cover the surface, said layered structure comprising:

(a) a first flexible layer of a resilient vibration-isolating material selected from a group consisting of plastic foam, rubber foam, rubber, and fibrous material, said first layer being adapted to be positioned in contact with and supported by said surface from or through which the noise emanates;

(b) an intermediate flexible layer of a heavy, limp, sound-insulating barrier material, said first layer being in contact with and bonded to the intermediate layer and serving to decouple the intermediate layer from said surface from or through which the noise emanates; and (c) an outer flexible surface-protective layer resistant to impact, wear, and abrasion, bonded to a face of the intermediate layer remote from the first layer.

15. A cladding as claimed in claim 14, in which the resilient vibration-isolating material has a hardness in one of the ranges of 0 to 100 degrees on the Shore 00 scale and 0 to 50 degrees on the Shore A scale.

16. A cladding as claimed in claim 15, in which the hardness is in one of the ranges of 5 to 95 degrees on the Shore 00 scale or 10 to 30 degrees on the Shore A scale.

17. A cladding as claimed in claim 16, in which the hardness is in the range 25 to 70 degrees on the Shore 00 scale.

18. A cladding as claimed in claim 14, in which the face of the first layer remote from the intermediate layer has a series of castellations or projections.

19. A cladding as claimed in claim 14, in which the sound-insulating barrier material is selected from a group consisting of lead and metal-loaded plastic material.

20. A clamping as claimed in claim 14, in which the outer surface protective layer is about 0.1 to 3 mm thick and is made of a material selected from a group consisting of hard rubber, plastic, and bitumastic material.

21. A cladding as claimed in claim 20, in which said material of the outer surface-protective layer has a hardness in the range of 50 to 100 degrees on the shore A scale.

22. A cladding as claimed in claim 21, in which the hardness is in the range of 90 to 100 degrees on the Shore A scale.

23. A cladding as claimed in claim 14, in which the total thickness of the three layers is at most 6 mm.

24. A cladding as claimed in claim 14, wherein the first layer is about 1 to 5 mm thick and the intermediate layer is about 0.25 to 2.5 mm thick.

25. A stock tube provided with a flexible cladding comprising:

(a) a first flexible layer of a resilient vibration-isolating material selected from a group consisting of plastic foam, rubber foam, rubber, and fibrous material, and first layer being in contact with and enclosing an outer surface from or through which noise emanates out of the stock tube;

(b) an intermediate flexible layer of a heavy, limp, sound-insulating barrier material, said intermediate layer being in contact with and enclosing the first layer, said first layer decoupling the intermediate layer from the outer surface from or through which the noise emanates out of the stock tube; and (c) an outer flexible surface-protective layer resistant to impact, wear, and abrasion, enclosing the intermediate layer.

26. A stock tube as claimed in claim 25, in which the outer layer is made of a material selected from a group consisting of hard rubber, plastic, and bitumastic material.

27. A stock tube as claimed in claim 26, in which said material of the outer surface-protective layer has a hardness in the range of 50 to 100 degrees on the Shore A scale.

28. A stock tube as claimed in claim 27, in which the hardness is in the range of 90 to 100 degrees on the Shore A scale.

29. A stock tube as claimed in claim 25, in which the resilient vibration-isolating material has a hardness in one of the ranges of 1 to 100 degrees on the Shore 00 scale and 1 to 50 degrees on the Shore A scale.

30. A stock tube as claimed in claim 29, in which the hardness is in one of the ranges of 5 to 95 degrees on the Shore 00 scale and 10 to 30 degrees on the Shore A scale.

31. A stock tube as claimed in claim 30, in which the hardness is in the range of 25 to 70 degrees on the Shore 00 scale.

32. A stock tube as claimed in claim 25, in which a face of the first layer adjacent to the outer surface of the stock tube has a series of castellations or projections in contact with said surface.

33. A stock tube as claimed in claim 25, in which the sound-insulating barrier material is selected from a group consisting of lead and metal-loaded plastic material.

34. A stock tube as claimed in claim 25, wherein the first layer is about 1 to 5 mm thick and the intermediate layer is about 0.25 to 2.5 mm thick.

35. A stock tube as claimed in claim 25, further comprising:

an additional layer of a resilient vibration-isolating material selected from a group consisting of plastic foam, rubber foam, rubber, and fibrous material, said additional layer being between and in contact with the intermediate layer and the tube and decoupling the tube from the intermediate layer.

36. A stock tube as claimed in claim 35, wherein the additional layer is about 1 to 5 mm thick.

37. A stock tube as claimed in claim 35, wherein the entire assembly of the stock tube, the three layers, and the additional layer are all inserted into a rigid outer casing.

38. A stock tube as claimed in claim 37, in which the rigid outer casing is made of steel.

39. A stock tube as claimed in claim 37, wherein the stock tube is provided at each end with a termination effective to prevent establishment of any sound transmission path between said stock tube, said intermediate layer and said rigid outer casing.

40. A stock tube as claimed in claim 39, in which each termination includes an annular bush disposed in abutting relationship with an end of the stock tube within said rigid outer casing, said bush being retained in position by end portions of said rigid outer casing, which end portions are bent inwardly into engagement with said bush.

41. A stock tube as claimed in claim 40, in which said bush is made of a material having a hardness in the range of 10 to 70 degrees on the Shore A scale.

* * * * *